(12) United States Patent
Campagna et al.

(10) Patent No.: US 8,701,169 B2
(45) Date of Patent: Apr. 15, 2014

(54) USING A SINGLE CERTIFICATE REQUEST TO GENERATE CREDENTIALS WITH MULTIPLE ECQV CERTIFICATES

(75) Inventors: Matthew John Campagna, Ridgefield, CT (US); Robert John Lambert, Cambridge (CA); James Robert Alfred, Mississauga (CA)

(73) Assignee: Certicom Corp., Mississauga (CA)

( * ) Notice: Subject to any disclaimer, the term of this patent is extended or adjusted under 35 U.S.C. 154(b) by 107 days.

(21) Appl. No.: 13/370,764

(22) Filed: Feb. 10, 2012

(65) Prior Publication Data

US 2013/0046972 A1 Feb. 21, 2013

(30) Foreign Application Priority Data

Feb. 11, 2011 (WO) ................ PCT/US2011/024505

(51) Int. Cl.
*G06F 7/04* (2006.01)
*H04L 29/06* (2006.01)
*H04L 9/32* (2006.01)
*H04L 9/08* (2006.01)
*G06F 17/30* (2006.01)

(52) U.S. Cl.
CPC .......... *H04L 9/3263* (2013.01); *H04L 63/0823* (2013.01); *H04L 29/06* (2013.01); *H04L 9/083* (2013.01); *H04L 9/0861* (2013.01)
USPC ................. 726/6; 713/175; 713/156; 726/10; 380/30

(58) Field of Classification Search
CPC ....... H04L 29/06; H04L 9/083; H04L 9/0861; H04L 9/3263; H04L 9/3252; H04L 63/0823
USPC .............. 713/156, 175; 726/6, 10, 18; 380/30
See application file for complete search history.

(56) References Cited

U.S. PATENT DOCUMENTS

| 5,610,982 A * | 3/1997 | Micali ........................... 713/157 |
| 6,675,296 B1 * | 1/2004 | Boeyen et al. ................ 713/156 |
| 6,792,530 B1 | 9/2004 | Qu et al. |

(Continued)

FOREIGN PATENT DOCUMENTS

| WO | 99/49612 A1 | 9/1999 |
| WO | 03/009561 A2 | 1/2003 |
| WO | 03/079627 A2 | 9/2003 |
| WO | WO 2010129694 A1 * | 11/2010 |

OTHER PUBLICATIONS

Sans. "Key and Certificate Management in Public Key Infrastructure Technology", Aug. 2001.*
Certicom Corp., Standards for Efficient Cryptography, SEC 1: Elliptic Curve Cryptography, version 1.0, Sep. 20, 2000.

(Continued)

*Primary Examiner* — Michael Simitoski
(74) *Attorney, Agent, or Firm* — Oblon, Spivak, McClelland, Maier & Neustadt, L.L.P.

(57) ABSTRACT

A method and apparatus are disclosed for using a single credential request (e.g., registered public key or ECQV certificate) to obtain a plurality of credentials in a secure digital communication system having a plurality of trusted certificate authority CA entities and one or more subscriber entities A. In this way, entity A can be provisioned onto multiple PKI networks by leveraging a single registered public key or implicit certificate as a credential request to one or more CA entities to obtain additional credentials, where each additional credential can be used to derive additional public key-private key pairs for the entity A.

24 Claims, 6 Drawing Sheets

(56) References Cited

U.S. PATENT DOCUMENTS

| | | | |
|---|---|---|---|
| 7,237,114 B1* | 6/2007 | Rosenberg | 713/176 |
| 2002/0046340 A1* | 4/2002 | Fujishiro et al. | 713/171 |
| 2002/0108041 A1* | 8/2002 | Watanabe et al. | 713/175 |
| 2002/0116611 A1* | 8/2002 | Zhou et al. | 713/156 |
| 2003/0018913 A1* | 1/2003 | Brezak et al. | 713/201 |
| 2005/0076205 A1 | 4/2005 | Thornton | |
| 2005/0081025 A1* | 4/2005 | Thornton et al. | 713/155 |
| 2005/0091484 A1* | 4/2005 | Thornton et al. | 713/156 |
| 2005/0108575 A1* | 5/2005 | Yung | 713/201 |
| 2005/0114651 A1* | 5/2005 | Qu et al. | 713/156 |
| 2007/0192843 A1* | 8/2007 | Peterson et al. | 726/10 |
| 2007/0226785 A1* | 9/2007 | Chow et al. | 726/8 |
| 2011/0087883 A1* | 4/2011 | Campagna et al. | 713/156 |

OTHER PUBLICATIONS

Certicom Corp., Standards for Efficient Cryptography, SEC 4: Elliptic Curve Cryptography, Working Draft, version 1.1r1, Jun. 9, 2006.
Certicom Corp., Standards for Efficient Cryptography, SEC 1: Elliptic Curve Qu-Vanstone Implicit Certificate Scheme (ECQV), Working Draft, version 0.91, Oct. 17, 2008.
Rene Struik, Certicom Corp., IEEE P802.15 Working Group for Wireless Personal Area Networks (WPANs), Mandatory ECC Security Algorithm Suite, Aug. 2, 2002.
International Search Report and Written Opinion for PCT Application No. PCT/US2011/024505, dated Oct. 18, 2011.
Office Action mailed on Sep. 18, 2013, in European Application No. 11704390.1-1860.

* cited by examiner

USING A SINGLE CERTIFICATE REQUEST TO GENERATE CREDENTIALS WITH MULTIPLE ECQV CERTIFICATES

BACKGROUND OF THE INVENTION

1. Field of the Invention

The present invention is directed in general to implicit certificate systems and methods for operating same. In one aspect, the present invention relates to the methods, systems and devices for generating credentials and certificates for implicitly verifying a public key.

2. Description of the Related Art

In electronic commerce or other information transactions over the Internet and other secure infrastructure, there are increasing security requirements for participating or otherwise provisioning secure hardware which require expensive control processes to uniquely identify and provide the necessary credential to the participants or hardware. To meet this need, systems have been developed for providing large-scale distribution of public keys and public key certificates. Public-key certificates are a vehicle by which public keys may be stored, distributed or forwarded over unsecured media without danger of undetectable manipulation so at to make one party's public key available to others such that its authenticity and validity are verifiable. Public-key certificates use a data structure consisting of a data part and a signature part. The data part contains cleartext data including, as a minimum, a public key and a string identifying the party to be associated therewith. The signature part consists of the digital signature of a certification authority (CA) over the data part, thereby binding the entities identity to the specified public key. With this arrangement, the CA is a trusted third party whose signature on the certificate vouches for the authenticity of the public key bound to the subject entity. One approach for distributing public keys involves implicitly-certified public key schemes where an explicit user public key is reconstructed rather than transported by public-key certificates as in certificate-based systems. An example of an implicitly certified public key mechanism is the original Elliptic Curve Qu-Vanstone Certificate (ECQV) scheme presented in "SEC 4: Elliptic Curve Cryptography Working Draft" which contains a method for creating implicit certificates which provide implicit authentication when the certificate is used in conjunction with an operation requiring the sender to use the private key, such as in an ECDH, ECMQV or ECDSA operation. ECQV Certificates are generated between a requestor and a certificate authority (CA). Under the ECQV scheme, when a user requests an implicit certificate for a public key from a CA, this public key (and the private key) is a random result of the computations made by the user and the CA. This has the direct consequence that once a ECQV implicit certificate is issued, one cannot get another ECQV implicit certificate for the same public key from a different CA.

Accordingly, a need exists for an improved method, system and device for providing credentials to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
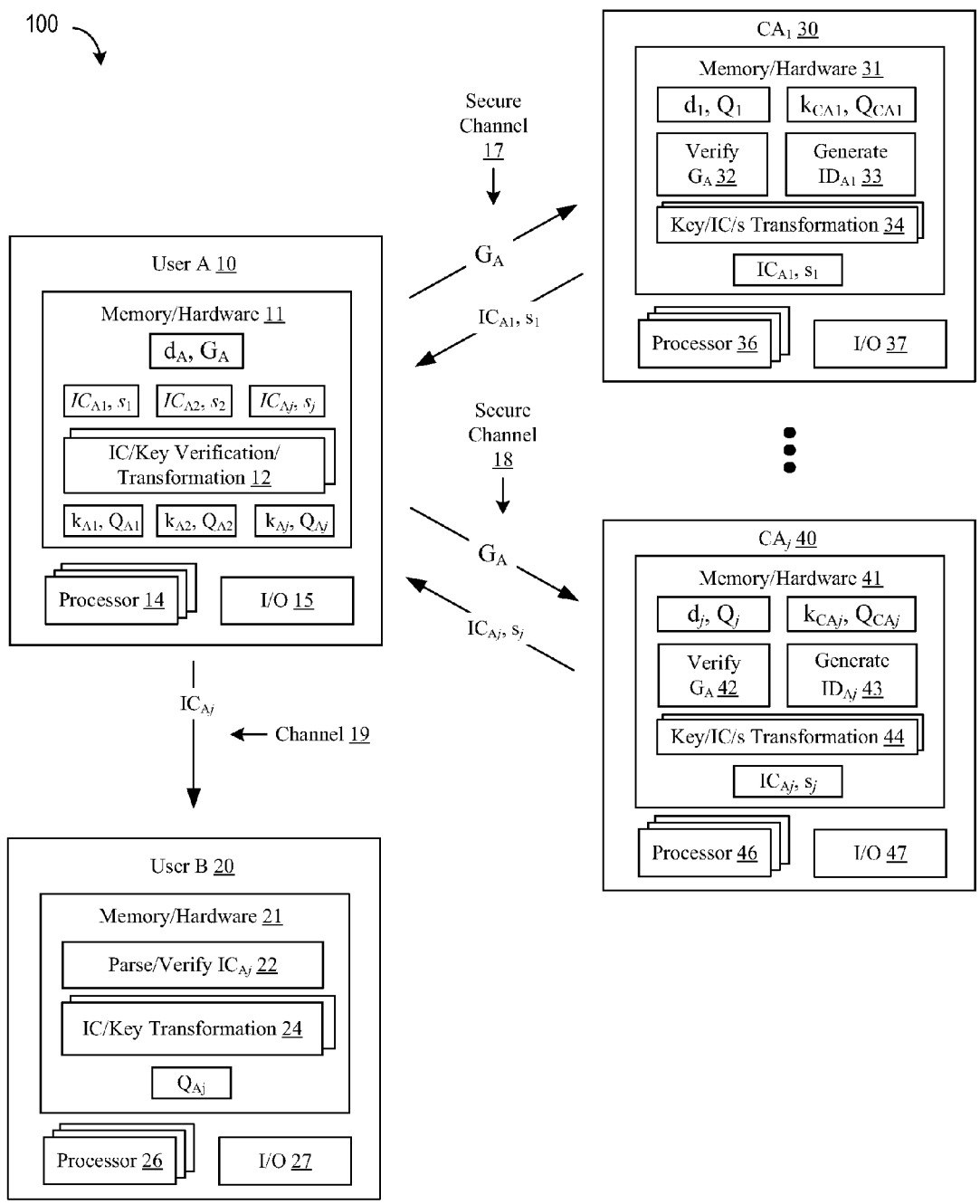
FIG. 1 is a schematic representation of a first system configuration in which a public key is used to obtain a plurality of credentials from different certificate authorities.

A method, system and device are provided for generating a plurality of public key pairs from a single private key in a secure digital communication system having a plurality of trusted entities or certificate authorities (CA) and subscriber entities. In selected embodiments, a subscriber entity A uses a single key pair to generate multiple requests to a plurality of different certificate authorities to provide a plurality of credentials or implicit certificates, such as Elliptic Curve Qu-Vanstone (ECQV) implicit certificates or ECQV-based credentials. To this end, the subscriber entity may use an initial registered public key to make multiple certificate requests to different certificate authorities to obtain multiple ECQV certificates as a means to accept registration of a subscriber entity device into a subsequent Public Key Infrastructure (PKI) transaction. As a result, a single public key is used to generate two or more certificates in different certificate authority domains without the registration costs that would otherwise be required to provision additional credentials onto the network. In other embodiments, the subscriber entity uses an initial implicit certificate, such as an ECQV certificate, to make multiple certificate requests to different certificate authorities such that the initial implicit certificate is used to validate one or more certificate requests for one or more additional ECQV certificates. In addition to reducing registration costs for provisioning additional credentials, the disclosed schemes allow a plurality of private keys to be derived from a single private key.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with communication system limits or design-related constraints, which will vary from one implementation to another. While such a development effort might be complex and time-consuming, it would nevertheless be a routine undertaking for those of ordinary skill in the art having the benefit of this disclosure.

For example, selected aspects are shown in block diagram form, rather than in detail, in order to avoid limiting or obscuring the present invention. In addition, some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, there is depicted a schematic representation of a first system 100 in which a public key associated with a first device 10 is used to obtain a plurality of credentials from different certificate authorities 20, 30 for implicitly certifying a plurality of public keys. The depicted system 100 includes at least a pair of first and second correspondents (A, B) 10, 20 and a plurality of trusted third parties ($CA_1$-$CA_j$) 30, 40. The correspondents A and B exchange information over a communication channel 19 by using software and/or hardware to perform cryptographic functions for transmitting, receiving, encrypting, decrypting and verifying exchanged information messages. To this end, each of the correspondents A and B includes, among other components, hardware and/or software executed by one or more processor elements for generating and applying encryption keys, as well as generating and processing credentials and credential requests.

As described herein, the first correspondent or device 10 (User A) can be any component or item that is capable of registering into a PKI transaction, and may represent, for example, a chip, circuit board, electronic consumer device, computer, processor, memory, etc. To this end, the first correspondent or device 10 is configured to transform a single key pair into a plurality of implicit credentials using one or more processors 14 that run one or more software programs embodied in non-transitory storage media device(s) (e.g., RAM, ROM, flash memory, etc.) or otherwise control dedicated hardware circuits in the memory/hardware module 11. For example, the first device 10 may include an asset control core (ACC) as an efficient cryptographic security engine that is integrated into a chip's design and used to generate and store a long-term key pair ($d_A$, $G_A$) during a controlled manufacturing process and register the public key as part of the device's unique identification. While the public key pair may be stored in memory 11 using elliptic curve domain parameters T=(p,a,b,G,n,h), it will be appreciated that other public key protocol domains may be used to define and process the public key pair.

Once the long-term key pair ($d_A$, $G_A$) is generated at the first device 10, the public key $G_A$ is included in a registered or otherwise controlled public key database using any desired registration process. Using the registered public key $G_A$ as credential request to two or more different certificate authorities 30, 40, the device 10 can be provisioned onto a plurality of networks by leveraging the controlled initial registration to issue additional credentials, possibly in a push transaction. This process is initiated when the first device 10 sends the same public key $G_A$ as credential request over the secure channels 17, 18 using appropriate input/output circuitry 15 to first and second certificate authorities $CA_1$, $CA_j$ 30, 40. In response, each certificate authority associates the first device 10 with a new credential (e.g., an ECQV certificate) for an associated secure PKI infrastructure.

To this end, each of the certificate authorities 30, 40 is configured to transform a single public key $G_A$ credential request into a unique implicit certificate using one or more processors 36 that run one or more software programs embodied in non-transitory storage media device(s) (e.g., RAM, ROM, flash memory, etc.) or otherwise control dedicated hardware circuits in the memory/hardware module 31. At the first certificate authority $CA_1$ 30, the credential request is received with appropriate input/output circuitry 37. The received credential request is then processed with the CA's key pair ($k_{CA1}$, $Q_{CA1}$) by first authenticating the received public key $G_A$ in the credential request. In selected embodiments, the verification module 32 shown in FIG. 1 may be used to verify the public key in the initial controlled database. If any identification information for the first device 10 is received as part of the credential request, this information may also be verified. If any information is not verified, the certificate authority $CA_1$ 30 returns a message indicating verification failure to the first device 10.

To transform the public key $G_A$ into a unique credential for the first device 10, the certificate authority $CA_1$ 30 generates an ephemeral key pair by selecting a random integer $d_1$ as a private key, and then computing a public key $Q_1$ using any desired key pair computation algorithm, including but not limited to elliptic curve key generation algorithms known to those skilled in the art. In addition, the certificate authority $CA_1$ 30 constructs identity and validity information $ID_{A1}$ for the first device 10. In selected embodiments, the ID generation module 33 shown in FIG. 1 may be used to generate identity information by choosing a unique distinguished name or identity $ID_{A1}$ (e.g., name, address, phone number, email address, MAC address) for the first device 10 or its associated User A. The certificate authority $CA_1$ 30 also combines or otherwise transforms the public keys $G_A$ and $Q_1$ to generate a public reconstruction value $B_{Ai}$, such as by using the key transformation module 34 to compute $B_{Ai}=G_A+Q_1$. The value pair ($ID_{A1}$, $B_{A1}$) serves as an implicit certificate $IC_{A1}$ for the first device 10. Finally, the certificate authority $CA_1$ 30 computes associated private key contribution data $s_1$ using trusted routines. In selected embodiments, the key/s transformation module 34 shown in FIG. 1 may be used to compute the private key contribution data $s_1$ by first computing the hash value $e_1$=Hash($IC_{A1}$) using a predetermined hash function, and then computing the integer $s=e_1 d_1+k_{CA1}$ (mod n) as the private key contribution data, where $d_1$ is $CA_1$'s ephemeral private key and $k_{CA1}$ is $CA_1$'s secret private key. The implicit certificate $IC_{A1}$ and private key contribution data $s_1$ are then securely returned to the first device 10 over secure channel 17 to provide $CA_1$'s signature on the identity information $ID_{Ai}$ as an implicit certificate for the first device 10.

In similar fashion, additional credentials can be generated from the public key $G_A$ by one or more additional certificate authorities (e.g., $CA_j$ 40) configured to transform the single public key $G_A$ credential request into a unique implicit certificate using one or more processors 46 that run one or more software programs embodied in non-transitory storage media device(s) (e.g., RAM, ROM, flash memory, etc.) or otherwise control dedicated hardware circuits in the memory/hardware module 41. Thus, the received credential request is processed with the $CA_j$'s key pair $(k_{CAj}, Q_{CAj})$ by verifying the received public key $G_A$ in the credential request and any other identification information with verification module 42. Once verified, the public key $G_A$ is then transformed by the additional certificate authority $CA_j$ 40 into a unique credential for the first device 10 for use with an established PKI infrastructure. In selected embodiments, the public key $G_A$ is transformed into a unique credential by generating an ephemeral key pair $(d_j, Q_j)$, constructing identity and validity information $ID_{Aj}$ for the first device 10 (e.g., with ID generation module 43), generating a public reconstruction value $B_{Aj}$ (e.g., $B_{Aj}=G_A+Q_j$), formatting an implicit certificate $IC_{Aj}$ from the value pair $(ID_{A1}, B_{A1})$, computing associated private key contribution data $s_j$ using trusted routines, and then returning the implicit certificate $IC_{Aj}$ and private key contribution data $s_j$ to the first device 10 over secure channel 18 to provide $CA_j$'s signature on the identity information $ID_{Aj}$ as an additional implicit certificate for the first device 10.

Under the disclosed scenario, a plurality of $CA_j$s can issue new network credential ECQV certificates to a first correspondent or device 10 (User A) to enable the user/device 10 to compute a plurality of private keys associated with those credentials, using a single private key $d_A$. To this end, the first device 10 stores each received implicit certificate $IC_{Ai}$ and private key contribution data $s_i$ in memory 11. In selected embodiments, the implicit certificate $IC_{Ai}$ and associated field element $s_i$ may be stored without providing confidentiality to the stored data. When the first device 10 requires use of this ECQV-credential in the application space of the $PKI_i$ infrastructure associated with a particular certificate authority $CA_i$ the first device 10 transforms the implicit certificate and associated field element to generate a unique private key using possibly pre-computed and stored values. The transformation process begins by retrieving and parsing the selected implicit certificate $IC_{Ai}$ to obtain the public reconstruction value $B_{Ai}$ and identity and validity information $ID_{Ai}$. In selected embodiments, the IC verification module 12 shown in FIG. 1 may be used to verify that the public reconstruction value $B_{Ai}$ is a point of required order on a predetermined curve, and to otherwise verify the identity and validity information $ID_{Ai}$ using predetermined application rules. If any information is not verified, the first device 10 terminates the process.

Once the information in the implicit certificate $IC_{Ai}$ is verified, the first device 10 may compute a key pair $(k_{Ai}, Q_{Ai})$ using trusted routines. In selected embodiments, the IC/key transformation module 12 shown in FIG. 1 may be used to compute the private key $k_{Ai}$ by first computing the hash value $e_i=Hash(IC_{Ai})$ using a predetermined hash function, and then computing the integer $k_{Ai}=e_i d_A+s_i$ (mod n), where $d_A$ is the first device's long term private key and $s_i$ is the associated private key contribution data. In addition, the first device 10 computes an associated public key $Q_{Ai}$ by combining or otherwise transforming the public reconstruction value $B_{Ai}$ and associated certificate authority's public key $Q_{CAi}$, such as by using the key transformation module 12 to compute $Q_{Ai}=e_i B_{Ai}+Q_{CAi}$.

As seen from above, the first device 10 can use a single private key $d_A$ to compute and store a plurality of key pairs $(k_{A1}, Q_{A1}), (k_{A2}, Q_{A2}), (k_{Aj}, Q_{Aj})$ that are respectively associated with a corresponding plurality of associated credentials and private key contribution data $(IC_{A1}, s_1), (IC_{A2}, s_2), \ldots, (IC_{Aj}, s_j)$. Alternatively, the first device 10 can store the received credentials $IC_{Ai}$ and associated private key contribution data $s_i$ in memory along with the pre-computed the hash value $e_i$ as a triple value $(e_i, s_i, IC_{Ai})$ and then reconstruct the private key $k_{Ai}$ associated with certificate $IC_{Ai}$ when needed. This approach allows the long term private key $d_A$ to be stored in secure memory storage that requires confidentiality and data integrity, while a second memory storage that requires only data integrity is used to store a plurality of credentials $((e_1, s_1, IC_{A1}), (e_2, s_2, IC_{A2}), \ldots (e_i, s_i, IC_{Ai}))$. Thus, whenever the first device 10 needs to authenticate within a secure infrastructure $PKI_i$, it recomputes the appropriate private key $k_{Ai}$ as specified above.

At whatever point the public key $Q_{Ai}$ is computed, the first device 10 can publish the public key $Q_{A1}$ in the public domain by publishing predetermined parameters, such as elliptic curve domain parameters $T=(p,a,b,G,n,h)$, in the public domain where they may be obtained by another correspondent or device 20 (User B) wishing to participate with User A in a secure infrastructure. Alternatively, the first device 10 (User A) can send one of its implicit certificates $IC_{Aj}$ to a second device 20 (User B) which then recovers User A's public key $Q_{Aj}$. To this end, the second device 20 may be configured to transform the received credential $IC_{Aj}$ into a public key $Q_{Aj}$ using one or more processors 26 that run one or more software programs embodied in non-transitory storage media device(s) (e.g., RAM, ROM, flash memory, etc.) or otherwise control dedicated hardware circuits in the memory/hardware module 21. The transformation process begins by retrieving and parsing the received credential $IC_{Aj}$ to obtain the public reconstruction value $B_{Aj}$ and identity and validity information $ID_{Aj}$. In selected embodiments, the IC verification module 22 shown in FIG. 1 may be used to verify that the public reconstruction value $B_{Aj}$ is a point on a predetermined curve, and to otherwise verify the identity and validity information $ID_A$ using predetermined application rules. If any information is not verified, the second device 20 terminates the process.

Once verified, the received credential $IC_{Aj}$ can be transformed by the second device 20 into a public key $Q_{Aj}$ for the first device 10 for use with an established PKI infrastructure. In selected embodiments, the IC/key transformation module 24 shown in FIG. 1 may be used to the transform the credential $IC_{Aj}$ by first computing the hash value $e_j=Hash(IC_{Aj})$ using a predetermined hash function, and then computing the public key $Q_{Aj}=e_j B_{Aj}+Q_{CAj}$ (mod n), where $Q_{CAj}$ is the public key for the $CA_j$ which issued the credential $IC_{Aj}$.

Although anyone can reconstruct User A's public key $Q_{CAj}$ from public data, this does not mean that the reconstructed public key $Q_{CAj}$ has been certified. Instead, authentication is implicit, meaning the authentication of the first device 10 (User A) is not considered complete until the first device 10 proves to be in possession of the corresponding private key $k_{CAj}$. This can be done by generating a signature on a message, or performing a key-agreement, such as the MQV (Menezes-Qu-Vanstone) key-agreement scheme, ECDH (Elliptic curve Diffie-Hellman) key-agreement scheme; ECMQV (Elliptic curve Menezes-Qu-Vanstone) key-agreement scheme, or ECDSA (Elliptic curve Digital Signature Algorithm) operation. It is only after this usage of the associated private key that the certificate is considered valid and the first device 10 can be authenticated.

Figure 2:
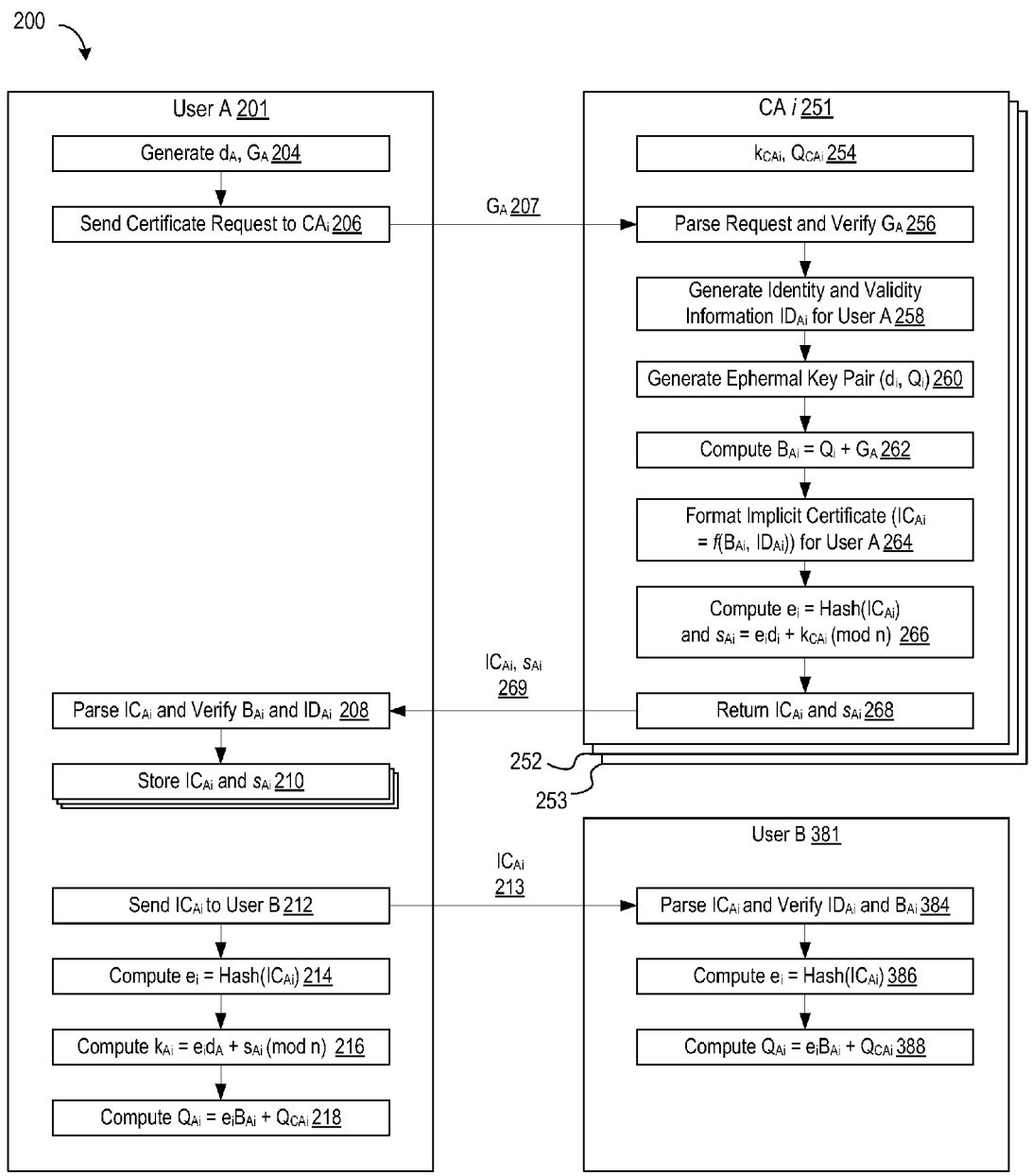
FIG. 2 depicts in flow chart form a procedure for obtaining a plurality of credentials from a single public key.

To illustrate an example methodology, reference is now made to FIG. 2 which depicts in flow chart form a procedure 200 for obtaining a plurality of credentials from a single public key that may be registered with a public key database.

With the procedure 200, a single registered public key is used to accept registration of User A's device into a plurality of secure PKI infrastructures by issuing multiple certificates from the single registered public key within different certificate authority domains to reduce overall registration costs of provisioning multiple credentials onto the network, and to allow multiple private keys to be derived from the single registered public key.

Once the procedure 200 starts, User A's device 201 generates a long-term key pair $(d_A, G_A)$ at step 204, where that public key $G_A$ may be included into a controlled public key database. To provision User A's device 201 onto multiple networks, the registered $G_A$ is leveraged to obtain a plurality of credentials from a plurality of certificate authorities 251-253 by sending a credential request 207 at step 206 which includes User A's long-term public key $G_A$. In an example implementation, the credential provisioning may be a push transaction onto User A's device 201.

At each of the certificate authorities 251-253, User A's device 201 is associated with a new credential IC, for the secure $PKI_i$ infrastructure associated with the $CA_i$ thereby allowing a plurality of different of certificate authorities $CA_i$ to issue separate network credential ECQV certificates which enable User A's device 201 to compute a corresponding plurality of associated private keys with those credentials, all based on a single long-term private key $d_A$ from User A's device 201. In particular, each certificate authority $CA_i$ transforms the credential request into an implicit certificate by first generating or retrieving a long-term key pair $(k_{CAi}, Q_{CAi})$ at step 254. Upon receiving the credential request 207 at step 256, the request is authenticated according to the procedures of the established $PKI_i$ infrastructure associated with the certificate authority $CA_i$. For example, User A's long-term public key $G_A$ is verified, such as by verifying the public key in a controlled or public key database. In addition, any received identification information for User A may be verified at step 256. If verification fails, the certificate authority $CA_i$ returns a FAIL message to User A's device 201 and to any controlling infrastructure.

At step 258, identity and validity information $ID_{Ai}$ for User A's device 201 may be constructed at each certificate authority $CA_i$. The User A identity information $ID_{Ai}$ may be constructed by choosing a unique distinguished name or identity (e.g., name, address, phone number, email address, MAC address) for User A. This identity information $ID_{A1}$ may be generated as octet string and shall containing identification information according to the procedures of the established infrastructure and may also contain other information, such as the intended use of the public key, the serial number of the implicit certificate, and the validity period of the implicit certificate. The exact form of $ID_{Ai}$ depends on the certificate format specified during the setup procedure.

At step 260, each certificate authority $CA_i$ generates an ephemeral key pair $(d_i, Q_i)$ using any desired key generation technique. For example, a predetermined elliptic curve key pair generation primitive may be used to generate an ephemeral key pair $(d_i, Q_i)$ for the specified elliptic curve domain parameters.

At step 262, each certificate authority $CA_i$ computes a public reconstruction value $B_{Ai}$. For example, the elliptic curve point $B_{Ai}=Q_i+G_A$ may be computed from the CA's ephemeral public key $Q_i$ and User A's public key $G_A$.

At step 264, each certificate authority $CA_1$ computes or constructs an implicit certificate $IC_{Ai}$ according to procedures of the established $PKI_i$ infrastructure. For example, the implicit certificate $IC_{Ai}$ may be generated as octet string containing identification the public reconstruction value $B_{Ai}$ and identity information $ID_{Ai}$. The exact form of the implicit certificate $IC_{A1}$ depends on the certificate format specified during setup.

At step 266, each certificate authority $CA_i$ computes a hash value $e_i$=Hash($IC_{Ai}$) using an established hash function. In addition, private key contribution data $s_{Ai}$ is derived from the hash value. For example, the private key contribution data $s_{Ai}=e_i d_i+k_{CAi}$ (mod n) is computed according to procedures of the implicit key infrastructure (e.g., ECQV).

If any of the computations or verifications in steps 256-266 fails, the process stops and an "invalid" message is output. Otherwise, a "valid" message is output and the implicit certificate $IC_{Ai}$ is returned along with the private key contribution data $s_{Ai}$ (step 268) to User A's device 201 via return message 269.

At step 208, each received implicit certificate $IC_{Ai}$ can be parsed to obtain the public reconstruction value $B_{Ai}$ and identity information $ID_{Ai}$, and these values can then be verified according to the procedures of the established PKI, infrastructure associated with the certificate authority $CA_i$.

At step 210, the implicit certificate $IC_{Ai}$ and associated private key contribution data $s_{Ai}$ may be stored at User A's device 201 in one or more memory storage devices. In selected embodiments, the information can be stored without the need of providing confidentiality to this data.

With the ECQV-based credentials $IC_{Ai}$ stored, User A's device 201 can use each ECQV-based credential $IC_{Ai}$ to securely communicate with another device in the application space of $PKI_i$ (e.g., User B 381) by sending the credential $IC_{Ai}$ in message 213 at step 212.

At User B's device 381, the received credentials $IC_{Ai}$ is parsed and verified at step 384 to obtain the public reconstruction value $B_{Ai}$ and identity information $ID_{Ai}$. A hash value $e_i$=Hash($IC_{Ai}$) is then computed at step 386, and the hash value is then used to derive the public key $Q_{Ai}$ for User A's device 201 by computing $Q_{Ai}=e_i B_{Ai}+Q_{CAi}$.

At the same time, User A's device 201 constructs a key pair $(k_{Ai}, Q_{Ai})$ in the application space of $PKI_i$, using possibly pre-computed and stored values and the following transformation. For example, User A's device 201 computes a hash value $e_i$=Hash($IC_{Ai}$) at step 214, and the hash value is then used to derive the key pair $(k_{Ai}, Q_{Ai})$. For example, the private key $k_{Ai}$ for User A's device 201 is generated by computing $k_{Ai}=e_i d_A+s_{Ai}$ (mod n) at step 216. In addition, the public key $Q_{Ai}$ for User A's device 201 is generated by computing $Q_{Ai}=e_i B_{Ai}+Q_{CAi}$ at step 218. As seen from the foregoing, both User A 201 and User B 381 derive the same public key $Q_{Ai}$ from the implicit certificate $IC_{Ai}$.

Figure 3:
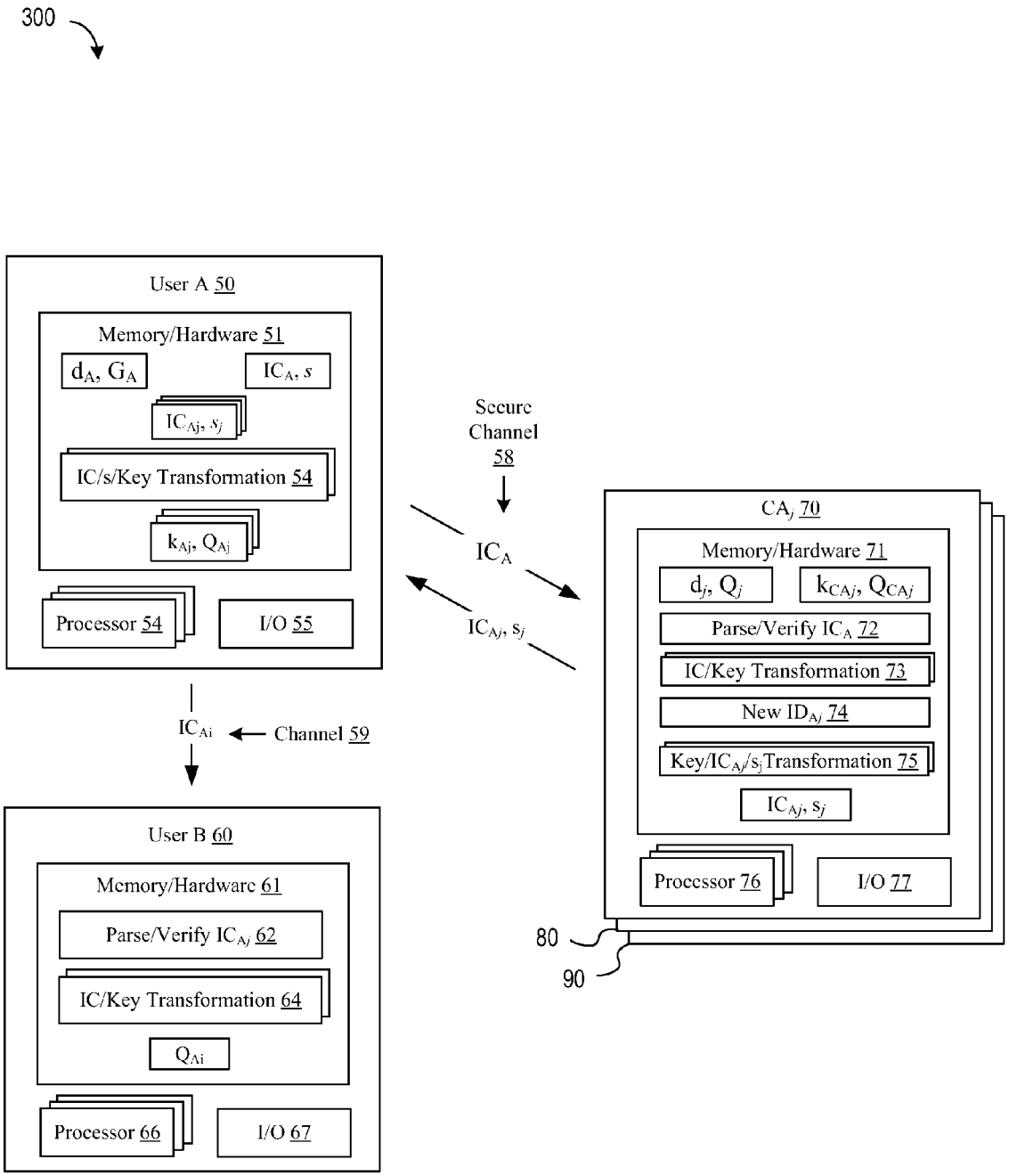
FIG. 3 is a schematic representation of a second system configuration in which an existing implicit certificate is used to obtain a plurality of credentials from different certificate authorities.

As described hereinabove, selected embodiments are provided for using a single public key to make multiple certificate requests to different certificate authorities to acquire additional ECQV-based credentials. However, selected embodiments also provided for using a single credential, such as an existing ECQV certificate, to validate multiple certificate requests to different certificate authorities to acquire additional ECQV-based credentials. To illustrate selected examples of such certificate-based credential requests, reference is now made to FIG. 3 in which there is depicted a schematic representation of a system 300 in which an existing implicit certificate associated with a first device 50 is used to obtain a plurality of credentials from different certificate authorities 70, 80, 90 for implicitly certifying a plurality of public keys. The depicted system 300 includes at least a pair of first and second correspondents (A, B) 50, 60 and a plurality of trusted third parties ($CA_i$-$CA_j$) 70, 80, 90. The correspondents A and B exchange information over a communication channel 59 by using software and/or hardware to perform cryptographic functions for transmitting, receiving, encrypting, decrypting and verifying exchanged information messages. To this end, each of the correspondents A and B includes, among other components, hardware and/or software executed by one or more processor elements for generating and applying encryption keys, as well as generating and processing credentials and credential requests.

As described herein, the first correspondent or device 50 (User A) can be any component or item that is capable of registering into a PKI transaction (e.g., a chip, circuit board, electronic consumer device, computer, processor, memory, etc.). The depicted first device 50 has previously been installed with a credential $IC_A$, such as an ECQV certificate issued by a certificate authority (not shown) based on the long-term key pair $(d_A, G_A)$. With a factory installed credential $IC_A$, the first device 50 may represent a ZigBee Smart Energy (ZSE) device that is manufactured with an ECQV certificate $IC_A$ issued from a root Certificate Authority (CA). Alternatively, the depicted first device 50 may be installed with a certificate $IC_A$ based on the long-term key pair $(d_A, G_A)$ substantially as described hereinabove with reference to FIG. 1. However installed, the certificate $IC_A$ can be used leverage the provisioning of the first device 50 into a plurality of public key infrastructures (PKI) by transforming the single certificate $IC_A$ into one or more additional certificates $IC_j$.

In support of this transformation, the first device 50 stores the long-term key pair $(d_A, G_A)$ and certificate $IC_A$ in device memory 51. In addition, the first device 50 is configured to transform a single credential (e.g., ECQV certificate) into a plurality of implicit credentials using one or more processors 54 that run one or more software programs embodied in non-transitory storage media device(s) (e.g., RAM, ROM, flash memory, etc.) or otherwise control dedicated hardware circuits in the memory/hardware module 51. The transformation process is initiated when the first device 50 sends the single existing credential or certificate $IC_A$ as credential request over the secure channel(s) 58 using appropriate input/output circuitry 55 to one or more certificate authorities $CA_j$ 70, 80, 90. In response, each certificate authority associates the first device 10 with a new credential (e.g., an ECQV certificate) for an associated secure PKI infrastructure.

For example, a first certificate authority $CA_j$ 70 is configured to transform a single ECQV certificate $IC_A$ credential request into a new, unique implicit certificate using one or more processors 76 that run one or more software programs embodied in non-transitory storage media device(s) (e.g., RAM, ROM, flash memory, etc.) or otherwise control dedicated hardware circuits in the memory/hardware module 71. At the first certificate authority $CA_j$ 70, the credential request is received with appropriate input/output circuitry 77 and then processed with $CA_j$'s long-term key pair $(k_{CAj}, Q_{CAj})$ by first authenticating the received ECQV certificate $IC_A$ in the credential request. In selected embodiments, the parse and verification module 72 shown in FIG. 3 may be used to parse the received credential $IC_A$ to obtain the public reconstruction value $B_A$ and identity and validity information $ID_A$ associated therewith by verifying that public reconstruction value $B_A$ is a point on a predetermined curve, and to otherwise verify the identity and validity information $ID_A$ using predetermined application rules. If any information is not verified, the certificate authority $CA_j$ 70 terminates the process.

To transform the certificate $IC_A$ into a unique credential for the first device 50, the certificate authority $CA_j$ 70 first computes a new public reconstruction value $B_{Aj}$ using one or more trusted routines. In selected embodiments, the IC/key transformation module 73 shown in FIG. 3 may be used to compute the new public reconstruction value $B_{Aj}$ by first computing the first hash value $e_1 = Hash(IC_A)$ using a predetermined hash function. The IC/key transformation module 73 also generates a public key $Q_A$ for User A's device 50 by computing $Q_A = e_1 B_A + Q_{CAj}$. After generating an ephemeral key pair $(d_j, Q_j)$, the IC/key transformation module 73 generates the new public reconstruction value $B_{Aj}$ by computing $B_{Aj} = Q_j + Q_A$.

In addition to computing a new public reconstruction value $B_{Aj}$, the certificate authority $CA_j$ 70 constructs new identity and validity information $ID_{Aj}$ for the first device 50. In selected embodiments, the ID generation module 74 shown in FIG. 3 may be used to generate identity information by choosing a unique distinguished name or identity $ID_{Aj}$ (e.g., name, address, phone number, email address, MAC address) for the first device 50 or its associated User A.

At the Key/IC transformation module 75, the value pair $(ID_{Aj}, B_{Aj})$ is formatted to generate a new implicit certificate $IC_{Aj}$ for the first device 50. In addition, the transformation module 75 computes associated private key contribution data $s_j$ using one or more trusted routines, such as by computing a second hash value $e_2 = Hash(IC_{Aj})$ using a predetermined hash function, and then computing the integer $s_j = e_2 d_j + k_{CAj}$ (mod n) as the private key contribution data, where $d_j$ is $CA_j$'s ephemeral private key and $k_{CAj}$ is $CA_j$'s secret private key. The implicit certificate $IC_{Aj}$ and private key contribution data $s_j$ are then securely returned to the first device 50 over secure channel 58 to provide $CA_j$'s signature on the identity information $ID_{Aj}$ as an implicit certificate for the first device 50.

In similar fashion, additional credentials can be generated from the single ECQV certificate $IC_A$ by one or more additional certificate authorities $CA_i$ 80, 90 that are similarly configured to transform the single $IC_A$ credential request into a unique implicit certificate using one or more processors that run one or more software programs embodied in non-transitory storage media device(s) (e.g., RAM, ROM, flash memory, etc.) or otherwise control dedicated hardware circuits in the memory/hardware module (not shown). In particular, the received credential request is processed with $CA_i$'s key pair $(k_{CAi}, Q_{CAi})$ by verifying the public reconstruction value $B_A$ and identity and validity information $ID_A$ in the credential request $IC_A$, transforming the credential request $IC_A$ into a new public reconstruction value $B_{Ai}$, constructing new identity and validity information $ID_{Ai}$ for the first device 50, formatting an implicit certificate $IC_{Ai}$ from the value pair $(ID_{Ai}, B_{Ai})$, computing associated private key contribution data $s_i$ using trusted routines, and then returning the implicit certificate $IC_{Ai}$ and private key contribution data $s_i$ to the first device 50 over secure channel 58 to provide $CA_i$'s signature on the identity information $ID_{Ai}$ as an additional implicit certificate for the first device 50.

Under the disclosed scenario, one or more certificate authorities $CA_j$ can issue new network credential ECQV certificates to a first correspondent or device 50 (User A) to enable the user/device 10 to compute a plurality of private keys associated with those credentials, using a single ECQV-credential or other implicit certificate. To this end, the first device 50 stores each received additional implicit certificate $IC_{Aj}$ and private key contribution data $s_j$ in memory 51. Again, the implicit certificate $IC_{Aj}$ and associated field element $s_j$ may be stored without providing confidentiality to the stored data. When the first device 50 requires use of any additional ECQV-credential $IC_{Aj}$ in the application space of the PKI, infrastructure associated with a particular certificate authority $CA_j$, the first device 50 transforms the implicit certificate $IC_{Aj}$ and associated field element $s_j$ to generate a unique private key-public key pair $(k_{Aj}, Q_{Aj})$ using the IC/s/Key transformation module 54 and private key $d_A$ using trusted routines substantially as described hereinabove. In this way, the first device 50 may use a single private key $d_A$ and ECQV certificate $IC_A$ to compute and store a plurality of key pairs ($k_{A1}$, $Q_{A1}$), ($k_{A2}$, $Q_{A2}$), ($k_{Aj}$, $Q_{Aj}$) that are respectively associated with a corresponding plurality of associated credentials and private key contribution data $IC_{A1}$, $s_1$), ($IC_{A2}$, $s_2$), ($IC_{Aj}$, $s_j$). Alternatively, the additional credentials $IC_{Aj}$ and associated private key contribution data $s_j$ can be retrieved from memory along with the pre-computed the hash value $e_j$ and used to reconstruct the key pair ($k_{Aj}$, $Q_{Aj}$) associated with certificate $IC_{Aj}$ when needed.

Similar to the embodiments described with reference to FIG. 1, the first device 50 (User A) will then have a private key $d_A$ that is associated with each public key $Q_{Ai}$ that is recoverable from the implicit certificate $IC_{Ai}$ by the second device 60 (User B) from the additional implicit certificate $IC_{Ai}$. At the first device 50, the initial private key $d_A$ is the only private credential that User A should store in secret memory in order to keep secret the rest of his credentials issued for other networks. The other credential values value ($e_i$, $s_i$, $IC_{Ai}$) can be stored in a separate memory that requires only data integrity, thereby providing cost and processing speed advantages. At the second device 60, the received implicit certificate $IC_{Ai}$ can be transformed into a public key $Q_{Ai}$ for the first device 50 for use with an established $PKI_j$ infrastructure by first parsing and verifying the received implicit certificate $IC_{Ai}$ (with module 62) and then transforming the received implicit certificate $IC_{Ai}$ (with module 64) by first computing a hash value $e_i$=Hash($IC_{Ai}$) and then computing the public key $Q_{Ai}=e_i B_{Ai}+Q_{CAi}$ (mod n), where $Q_{CAi}$ is the public key for the $CA_i$ which issued the credential $IC_{Ai}$.

As seen from the foregoing, a single certificate $IC_A$, such as a factory installed ECQV certificate, can be used as a certificate request to one or more certificate authorities so that any certificate authority $CA_j$ with a long-term key pair ($d_{CAj}$, $Q_{CAj}$), the ECQV certificate $IC_A$ for User A, and the originating certificate authority's public key $Q_{CA}$ can issue new credentials for $PKI_j$ from the certificate authority $CA_j$. Further, if the registration process used by the initial certificate authority is deemed adequate, the additional certificate can be issued with implicit verification.

Figure 4:
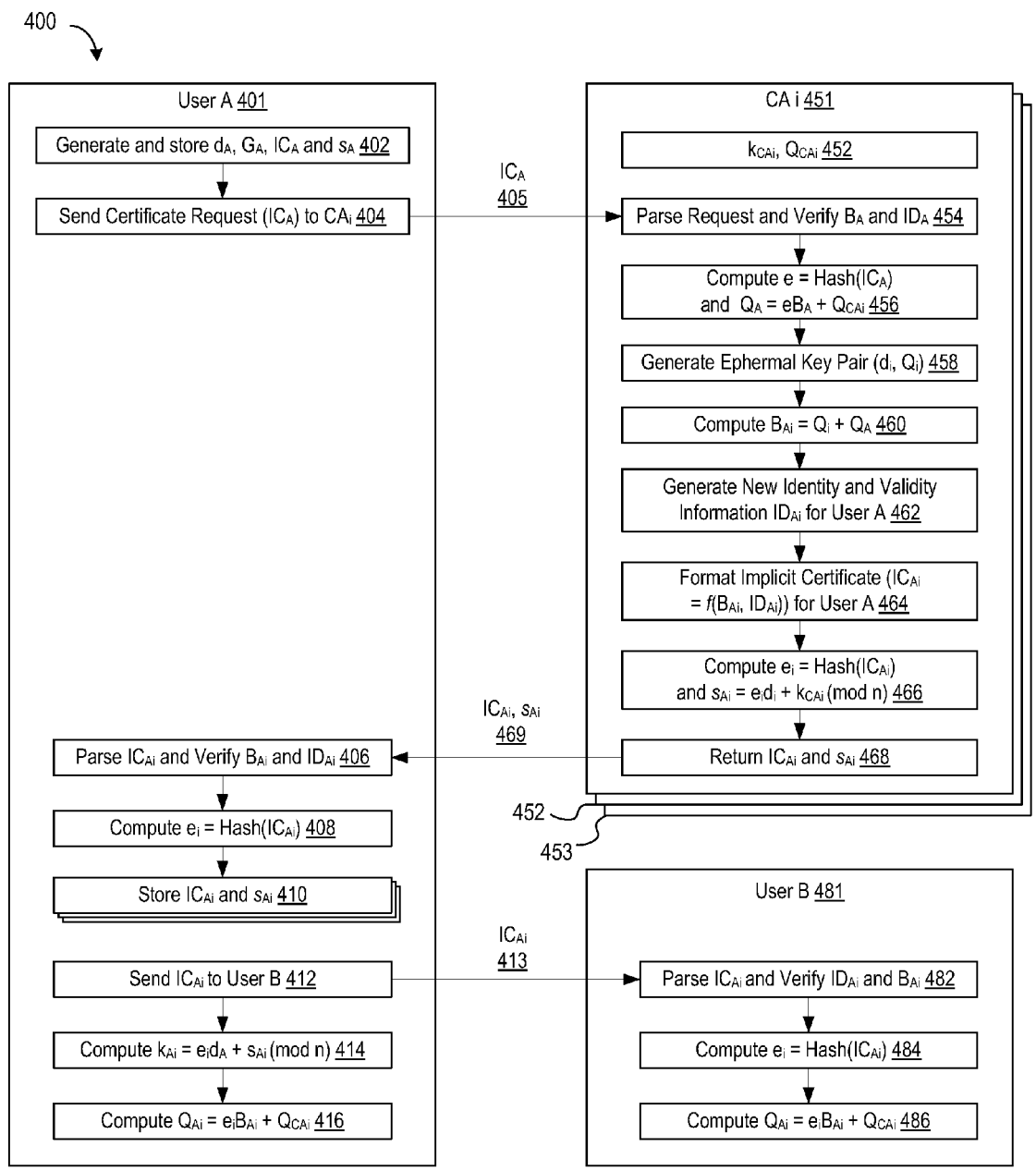
FIG. 4 depicts in flow chart form a procedure for obtaining a plurality of credentials from a single implicit certificate.

To illustrate an example methodology, reference is now made to FIG. 4 which depicts in flow chart form a procedure 400 for obtaining a plurality of credentials from a single implicit certificate. With the procedure 400, a single implicit certificate is used to validate registration of User A's device into a plurality of secure PKI infrastructures by issuing multiple certificates from the single implicit certificate within different certificate authority domains to reduce overall registration costs of provisioning multiple credentials onto the network.

Once the procedure 400 starts, User A's device 401 generates or obtains a long-term key pair ($d_A$, $G_A$) and an associated implicit certificate $IC_A$ (e.g., an ECQV certificate) and field element $s_A$ at step 402. To provision User A's device 401 onto multiple networks, the implicit certificate $IC_A$ is leveraged to obtain a plurality of additional credentials from one or more certificate authorities 451-453 by sending a credential request 405 at step 404 which includes User A's credential or implicit certificate $IC_A$. In an example implementation, the credential request may be a push transaction onto User A's device 401 by an infrastructure already having the required information.

At the certificate authority $CA_i$ 451, User A's device 401 is associated with a new credential IC, for the secure $PKI_i$ infrastructure associated with the $CA_i$ by having the CA issue a separate network credential $IC_{Ai}$ which enables User A's device 401 to compute an associated private key with that credential that is derived a single long-term private key $d_A$ from User A's device 401. In particular, $CA_i$ 451 transforms the credential request into an implicit certificate by first generating or retrieving a long-term key pair ($k_{CAi}$, $Q_{CAi}$) at step 452.

Upon receiving the credential request 405 at step 454, the request is parsed and verified according to the procedures of the established $PKI_i$ infrastructure associated with the certificate authority $CA_i$. For example, User A's credential $IC_A$ is parsed to extract the public reconstruction value $B_A$ and identity information $ID_A$ for User A, and the extracted values are verified by confirming that the extract value $B_A$ is a point of required order on a predetermined curve, and to otherwise verify the identity and validity information $ID_A$ using predetermined application rules. If verification fails, the certificate authority $CA_i$ returns a FAIL message to User A's device 401.

Once verified, the received credential $IC_A$ can be transformed by $CA_i$ 451 into a unique credential for the first device 401. The credential transformation process beings at step 456 by computing a first hash value $e_1$=Hash($IC_A$) using a predetermined hash function. In addition, a public key $Q_A$ is generated for User A's device 401 by computing $Q_A=e_1 B_A+Q_{CAi}$. After generating an ephemeral key pair ($d_i$, $Q_i$), a new public reconstruction value $B_{Ai}$ is generated at step 460 by computing $B_{Ai}=Q_i+Q_A$.

At step 462, new identity and validity information $ID_{Ai}$ for User A's device 401 may be constructed at $CA_i$ 451, such as by choosing a unique distinguished name or identity for User A or otherwise including identification information according to the procedures of the established infrastructure. The exact form of $ID_{Ai}$ depends on the certificate format specified during the setup procedure.

At step 464, $CA_i$ 451 computes or constructs an implicit certificate $IC_{Ai}$ as a function of the new public reconstruction value $B_{Aj}$ and new identity and validity information $ID_{Ai}$ according to procedures of the established $PKI_i$ infrastructure. The exact form of the implicit certificate $IC_{Ai}$ depends on the certificate format specified during setup.

At step 466, $CA_i$ 451 computes a second hash value $e_2$=Hash($IC_{Ai}$) using an established hash function. In addition, private key contribution data $s_{Aj}$ is derived from the hash value. For example, the private key contribution data $s_{Ai}=e_2 d_i+k_{CAi}$ (mod n) is computed according to procedures of the established implicit certificate infrastructure.

If any of the computations or verifications in steps 454-466 fails, the process stops and an "invalid" message is output. Otherwise, a "valid" message is output and the implicit certificate $IC_{Ai}$ is returned along with the private key contribution data $s_{Ai}$ (step 468) to User A's device 401 via return message 469.

Under the disclosed scenario, a plurality of certificate authorities 451-453 can each issue a new network credential ECQV certificate to a first correspondent or device 401 (User A) in response to the single implicit certificate $IC_A$ (e.g., an ECQV certificate) to enable the user/device 401 to compute a plurality of private keys associated with those credentials using a single private key $d_A$.

To generate multiple private keys, the first device 401 parses each received certificate $IC_{Ai}$ to extract and verify the public reconstruction value $B_{Ai}$ and associated information $ID_{Ai}$ at step 406. In addition, the hash value $e_i$=Hash($IC_{Ai}$) may be computed using a predetermined hash function at step 408. At step 410, each received implicit certificate $IC_{Ai}$, private key contribution data $s_{Ai}$ and associated hash value $e_i$ are stored in memory.

When a secure communication between the first device 401 (User A) and second device 481 (User B) requires access to the application space of the $PKI_i$ infrastructure associated with a particular certificate authority $CA_i$ the first device 401 sends the implicit certificate $IC_{Ai}$ associated with the $CA_i$ to the second device 481 in a message 413 at step 412. At the second device 481, the received certificate $IC_{Aj}$ is parsed and verified to extract $ID_{Ai}$ and $B_{Ai}$ (step 482), hashed to compute $e_i$=Hash($IC_{Ai}$) (step 484), and transformed into User A's public key $Q_{Ai}$ by computing $Q_{Ai}=e_iB_{Ai}+Q_{CAi}$. Simultaneously, the first device 401 transforms the implicit certificate $IC_{Aj}$ and associated field element $s_{Aj}$ to generate a unique private key using the pre-computed and stored values ($IC_{Ai}$, $s_{Ai}$, $e_i$). The transformation process begins by computing the private key $k_{Ai}=e_i \ d_A+s_{Ai}$ (mod n) at step 414, where $e_i$ is the stored or computed hash value, $d_A$ is User A's long term private key, and $s_i$ is the associated private key contribution data. The corresponding public key $Q_{Ai}$ for User A is then generated at step 416 by computing $Q_{Ai}=e_iB_{Ai}+Q_{CAi}$ As seen from the foregoing, a variety of techniques are provided for leveraging an initial controlled public key registration or a previous ECQV certificate, each with an associated private key, to obtain one or more additional ECQV certificates and credentials for acceptance into other PKIs, thereby reducing registration costs and enabling multiple private keys to be derived from a single long-term private key. As a result, these techniques are well suited for use with devices having limited certificate processing functionality, such as small, low-power radio control devices requiring secure networking having factory-installed key pairs (e.g., ($d_A$, $G_A$) or implicit certificates (e.g., ECQV certificates). However, it will be appreciated that the benefits of extending credentials to a plurality of PKIs can also be applied to other devices having enhanced certificate processing capabilities, such as an authentication server, host system, solution server, wireless communications device (such as a mobile device, BlackBerry device or other user equipment), or other communication device which requires secure networking.

Figure 5:
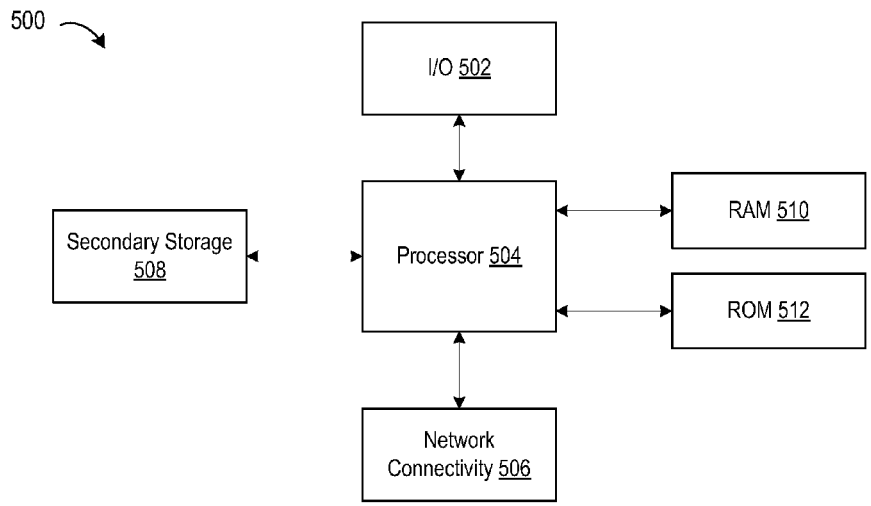
FIG. 5 illustrates an example computer system that may be suitable for implementing the credential processing at a user device or certificate authority.

The user device and certificate authority elements described herein may include any general or special purpose computer with sufficient processing power, memory resources, and network throughput capability to handle the necessary workload placed upon it. FIG. 5 illustrates an example computer system 500 that may be suitable for implementing one or more embodiments disclosed herein. The computer system 500 includes a processor 504 (which may be referred to as a central processor unit or CPU) that is in communication with input/output (I/O) devices 502, network connectivity devices 506, an optional secondary storage 508, random access memory (RAM) 510, and read only memory (ROM) 512. The processor may be implemented as one or more CPU chips.

The secondary storage 508 is optionally included, and typically includes one or more disk drives or tape drives used for non-volatile storage of data and/or for over-flow data storage device if RAM 510 is not large enough to hold all working data. Secondary storage 508 may be used to store programs which are loaded into RAM 510 when such programs are selected for execution. The ROM 512 is used to store instructions and perhaps data which are read during program execution. ROM 512 is a non-volatile memory device which typically has a small memory capacity relative to the larger memory capacity of secondary storage. The RAM 510 is used to store volatile data and perhaps to store instructions. Access to both ROM 512 and RAM 510 is typically faster than to secondary storage 508.

I/O devices 502 may include on or more printers, video monitors, liquid crystal displays (LCDs), touch screen displays, keyboards, keypads, switches, dials, mice, track balls, voice recognizers, card readers, paper tape readers, or other well-known input devices.

The network connectivity devices 506 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 506 devices may enable the processor 504 to communicate with an Internet or one or more intranets. With such a network connection, it is contemplated that the processor 504 might receive information from the network, or might output information to the network in the course of performing the above-described method steps. Such information, which is often represented as a sequence of instructions to be executed using processor 504, may be received from and outputted to the network, for example, in the form of a computer data signal embodied in a carrier wave or a non-transitory computer readable storage medium, such as RAM, ROM or other memory storage devices.

Such information, which may include data or instructions to be executed using processor 504 for example, may be received from and outputted to the network, for example, in the form of a computer data baseband signal or signal embodied in a carrier wave. The baseband signal or signal embodied in the carrier wave generated by the network connectivity 506 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 504 executes instructions, codes, computer programs, scripts which it accesses from hard disk, floppy disk, optical disk (these various disk-based systems may all be considered secondary storage 508), ROM 512, RAM 510, or the network connectivity devices 506. While only one processor 504 is shown, multiple processors may be present. Thus, while instructions may be discussed as executed by a processor, the instructions may be executed simultaneously, serially, or otherwise executed by one or multiple processors. In addition or in the alternative, any required processing functionality may be executed by a cryptographic engine or other hardware accelerator circuit (not shown).

Figure 6:
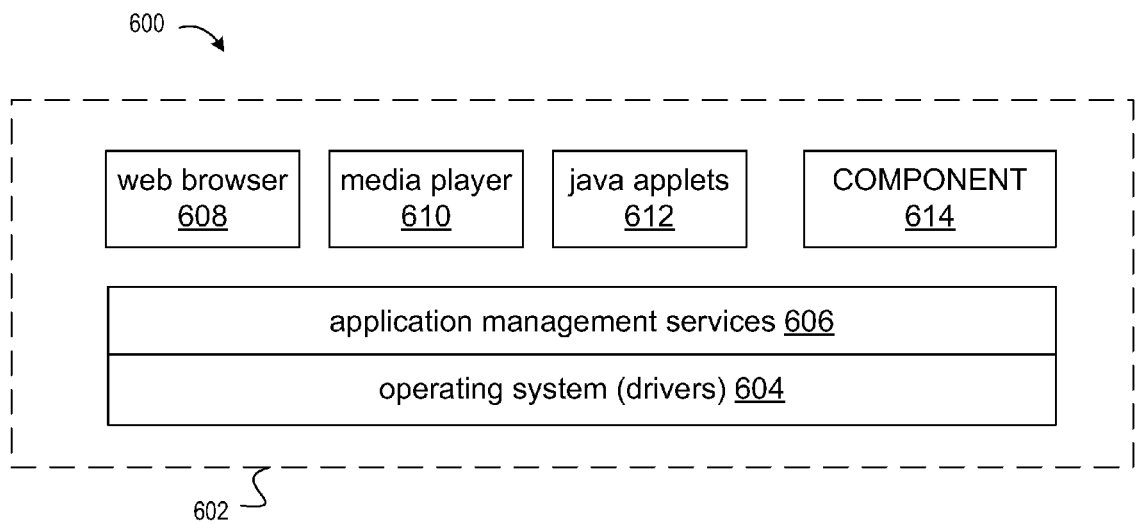
FIG. 6 is a diagram of a software environment that may be implemented on a user agent and/or certificate authority operable for some of the various embodiments of the disclosure.

FIG. 6 is a diagram of a software environment 600 that may be implemented on a communication device and/or certificate authority operable for some of the various embodiments of the disclosure. As illustrated, one or more processing resources at the communication device or CA execute operating system drivers 604 that provide a platform from which the rest of the software operates. The operating system drivers 604 provide drivers for the device hardware with standardized interfaces that are accessible to application software. The operating system drivers 604 include application management services ("AMS") 606 that transfer control between applications running on the device. In UE instances, the software environment 602 includes a web browser application 608, a media player application 610, and Java applets 612 are provided as device applications. The web browser application 608 configures the UE device to operate as a web browser, allowing a user to enter information into forms and select links to retrieve and view web pages. The media player application 610 configures the UE to retrieve and play audio or audiovisual media. The Java applets 612 configure the UE device to provide games, utilities, and other functionality. Finally, the component 614 may provide the credential processing functionality described herein.

Figure 7:
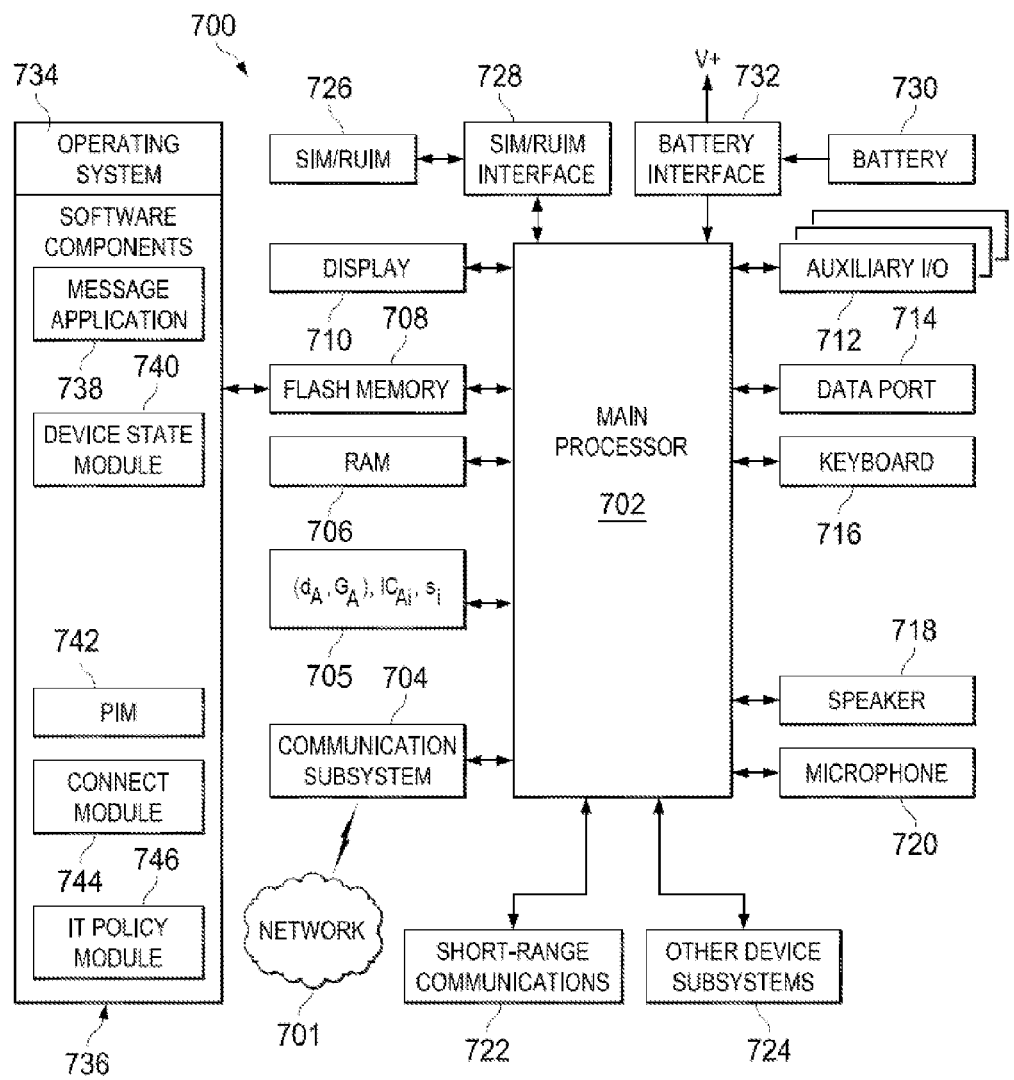
FIG. 7 is a schematic block diagram illustrating exemplary components of a mobile wireless communications device which may be used with selected embodiments of the present invention.

Turning now to FIG. 7, there is depicted a schematic block diagram illustrating exemplary components of a mobile wireless communications device 700 which may be used with selected embodiments of the present invention to extend a single registered public key or certificate credential to generate a plurality of certificate credentials. The wireless device 700 is shown with specific components for implementing features described above. It is to be understood that the wireless device 700 is shown with very specific details for exemplary purposes only. As depicted, user equipment 700 includes a number of components such as a main processor 702 that controls the overall operation of user equipment 700. Communication functions, including data and voice communications, are performed through a communication subsystem 704. The communication subsystem 704 receives messages from and sends messages to a wireless network 701. In this illustrative embodiment of user equipment 700, communication subsystem 704 is configured in accordance with the Global System for Mobile Communication (GSM) and General Packet Radio Services (GPRS) standards. The GSM/GPRS wireless network is used worldwide and these standards may be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 704 with the wireless network 701 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 701 associated with user equipment 700 is a GSM/GPRS wireless network in one implementation, other wireless networks may also be associated with user equipment 700 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future generation networks like EDGE, UMTS, WiMAX, LTE and LTE-A. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 702 also interacts with additional subsystems such as one or more key and credential memories 705, Random Access Memory (RAM) 706, a flash memory 708, a display 710, an auxiliary input/output (I/O) subsystem 712, a data port 714, a keyboard 716, a speaker 718, a microphone 720, short-range communications 722, and other device subsystems 724. As described herein, memory 705 provides secure storage for a long-term key pair $(d_A, G_A)$, and also stores any initial credential (e.g., ECQV certificate $IC_A$) and associated field element $s_A$, as well as any additional credential and field element values $(IC_{Ai}, s_i)$ that may be used to generate additional key pairs $(k_{Ai}, Q_{Ai})$ as described herein.

Some of the subsystems of the user equipment 700 perform communication-related functions, whereas other subsystems may provide "resident" or on-device functions. By way of example, the display 710 and the keyboard 716 may be used for both communication-related functions, such as entering a text message for transmission over the network 701, and device-resident functions such as a calculator or task list.

The user equipment 700 can send and receive communication signals over the wireless network 701 after required network registration or activation procedures have been completed. Network access is associated with a subscriber or user of the user equipment 700. To identify a subscriber, the user equipment 700 requires a SIM/RUIM card 726 (i.e. Subscriber Identity Module or a Removable User Identity Module) to be inserted into a SIM/RUIM interface 728 in order to communicate with a network. The SIM card or RUIM 726 is one type of a conventional "smart card" that can be used to identify a subscriber of the user equipment 700 and to personalize the user equipment 700, among other things. Without the SIM card 726, the user equipment 700 is not fully operational for communication with the wireless network 701. By inserting the SIM card/RUIM 726 into the SIM/RUIM interface 728, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 726 includes a processor and memory for storing information. Once the SIM card/RUIM 726 is inserted into the SIM/RUIM interface 728, it is coupled to the main processor 702. In order to identify the subscriber, the SIM card/RUIM 726 can include some user parameters such as an International Mobile Subscriber Identity (IMSI). An advantage of using the SIM card/RUIM 726 is that a subscriber is not necessarily bound by any single physical user equipment. The SIM card/RUIM 726 may store additional subscriber information for user equipment as well, including datebook (or calendar) information and recent call information. Alternatively, user identification information can also be programmed into the flash memory 708.

The user equipment 700 is a battery-powered device and includes a battery interface 732 for receiving one or more rechargeable batteries 730. In at least some embodiments, the battery 730 can be a smart battery with an embedded microprocessor. The battery interface 732 is coupled to a regulator (not shown), which assists the battery 730 in providing power V+ to the user equipment 700. Although current technology makes use of a battery, future technologies such as micro fuel cells may provide the power to the user equipment 700.

The user equipment 700 also includes an operating system 734 and software components 736 which are described in more detail below. The operating system 734 and the software components 736 that are executed by the main processor 702 are typically stored in a persistent store such as the flash memory 708, which may alternatively be a read-only memory (ROM) or similar storage element (not shown). Those skilled in the art will appreciate that portions of the operating system 734 and the software components 736 such as specific device applications, or parts thereof, may be temporarily loaded into a volatile store such as the RAM 706. Other software components can also be included, as is well known to those skilled in the art.

The subset of software components 736 that control basic device operations, including data and voice communication applications, will normally be installed on the user equipment 700 during its manufacture. Other software applications include a message application 738 that can be any suitable software program that allows a user of the user equipment 700 to send and receive electronic messages. Various alternatives exist for the message application 738 as is well known to those skilled in the art. Messages that have been sent or received by the user are typically stored in the random access or flash memory 708 of the user equipment 700 or some other suitable storage element in the user equipment 700. In at least some embodiments, some of the sent and received messages may be stored remotely from the device 700 such as in a data store of an associated host system that the user equipment 700 communicates with.

The software applications can further include a device state module 740, a Personal Information Manager (PIM) 742, and other suitable modules (not shown). The device state module 740 provides persistence, i.e. the device state module 740 ensures that important device data is stored in persistent memory, such as the flash memory 708, so that the data is not lost when the user equipment 700 is turned off or loses power.

The PIM 742 includes functionality for organizing and managing data items of interest to the user, such as, but not limited to, e-mail, contacts, calendar events, voice mails, appointments, and task items. A PIM application has the ability to send and receive data items via the wireless network 701. PIM data items may be seamlessly integrated, synchronized, and updated via the wireless network 701 with the user equipment subscriber's corresponding data items stored or associated with a host computer system. This functionality creates a mirrored host computer on the user equipment 700 with respect to such items. This can be particularly advantageous when the host computer system is the user equipment subscriber's office computer system.

The user equipment 700 also includes a connect module 744, and an IT policy module 746. The connect module 744 implements the communication protocols that are required for the user equipment 700 to communicate with the wireless infrastructure and any host system, such as an enterprise system, that the user equipment 700 is authorized to interface with.

The connect module 744 includes a set of APIs that can be integrated with the user equipment 700 to allow the user equipment 700 to use any number of services associated with the enterprise system. The connect module 744 allows the user equipment 700 to establish an end-to-end secure, authenticated communication pipe with the host system. A subset of applications for which access is provided by the connect module 744 can be used to pass IT policy commands from the host system to the user equipment 700. This can be done in a wireless or wired manner. These instructions can then be passed to the IT policy module 746 to modify the configuration of the device 700. Alternatively, in some cases, the IT policy update can also be done over a wired connection.

The IT policy module 746 receives IT policy data that encodes the IT policy. The IT policy module 746 then ensures that the IT policy data is authenticated by the user equipment 700. The IT policy data can then be stored in the flash memory 708 in its native form. After the IT policy data is stored, a global notification can be sent by the IT policy module 746 to all of the applications residing on the user equipment 700. Applications for which the IT policy may be applicable then respond by reading the IT policy data to look for IT policy rules that are applicable.

Other types of software applications can also be installed on the user equipment 700. These software applications can be third party applications, which are added after the manufacture of the user equipment 700. Examples of third party applications include games, calculators, utilities, etc.

The additional applications can be loaded onto the user equipment 700 through at least one of the wireless network 701, the auxiliary I/O subsystem 712, the data port 714, the short-range communications subsystem 722, or any other suitable device subsystem 724. This flexibility in application installation increases the functionality of the user equipment 700 and may provide enhanced on-device functions, communication-related functions, or both. For example, secure communication applications may enable electronic commerce functions and other such financial transactions to be performed using the user equipment 700.

The data port 714 enables a subscriber to set preferences through an external device or software application and extends the capabilities of the user equipment 700 by providing for information or software downloads to the user equipment 700 other than through a wireless communication network. The alternate download path may, for example, be used to load an encryption key onto the user equipment 700 through a direct, and thus reliable and trusted connection, to provide secure device communication.

The data port 714 can be any suitable port that enables data communication between the user equipment 700 and another computing device. The data port 714 can be a serial or a parallel port. In some instances, the data port 714 can be a USB port that includes data lines for data transfer and a supply line that can provide a charging current to charge the battery 730 of the user equipment 700.

The short-range communications subsystem 722 provides for communication between the user equipment 700 and different systems or devices, without the use of the wireless network 701. For example, the subsystem 722 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 704 and input to the main processor 702. The main processor 702 will then process the received signal for output to the display 710 or alternatively to the auxiliary I/O subsystem 712. A subscriber may also compose data items, such as e-mail messages, for example, using the keyboard 716 in conjunction with the display 710 and possibly the auxiliary I/O subsystem 712. The auxiliary subsystem 712 may include devices such as: a touch screen, mouse, track ball, infrared fingerprint detector, or a roller wheel with dynamic button pressing capability. The keyboard 716 is preferably an alphanumeric keyboard or telephone-type keypad. However, other types of keyboards may also be used. A composed item may be transmitted over the wireless network 200 through the communication subsystem 704.

For voice communications, the overall operation of the user equipment 700 is substantially similar, except that the received signals are output to the speaker 718, and signals for transmission are generated by the microphone 720. Alternative voice or audio I/O subsystems, such as a voice message recording subsystem, can also be implemented on the user equipment 700. Although voice or audio signal output is accomplished primarily through the speaker 718, the display 710 can also be used to provide additional information such as the identity of a calling party, duration of a voice call, or other voice call related information.

By now it should be appreciated that there is disclosed herein a method, apparatus, computer program product, and system for generating a plurality of unique credentials from a single credential request value in a secure digital communication system having a plurality of trusted entities $CA_i$ and at least one subscriber entity A. As disclosed, a first correspondent or entity A obtains a secret value $d_A$ and associated public value $G_A$. The values $d_A$ and $G_A$ may be obtained from secure memory or by generating an ephemeral public-key pair ($d_A$, $G_A$) associated with predetermined elliptic curve domain parameters for the secure digital communication system. Entity A sends a single credential request to a plurality of trusted entities $CA_i$, where the credential request includes a first value associated with the public value $G_A$. In selected embodiments, the credential request is the public value $G_A$ that is sent to the trusted entities $CA_i$, while in other embodiments, a previously issued implicit certificate $IC_A$ associated with the public key value $G_A$ is sent to the trusted entities $CA_i$, such as by sending an ECQV certificate $IC_A$ that is associated with predetermined elliptic curve domain parameters for the secure digital communication system. Subsequently, entity A receives from each of the trusted entities $CA_i$ a unique credential (e.g., implicit certificate $IC_{Ai}$) and associated private key contribution value (e.g., associated private key contribution value $s_{Ai}$), thereby obtaining and storing in memory a plurality of unique credentials from the corresponding plurality of trusted entities $CA_i$. In selected embodiments, the implicit certificate $IC_{Ai}$ includes (1) a public reconstruction value computed at the trusted entity $CA_i$ by mathematically combining public values associated with the trusted entity $CA_i$ and entity A, and (2) an identity value for entity A constructed at the trusted entity $CA_i$. In addition, the associated private key contribution value $s_{Ai}$ may be computed at the trusted entity $CA_i$ by binding a hash of the implicit certificate $IC_{Ai}$ with private values of the trusted entity $CA_i$. With the unique credentials and associated private key contribution values stored in memory, a private key may be generated that is associated with a unique credential received from a trusted entity $CA_i$ by deriving the private key from the unique credential, associated private key contribution value, and secret value $d_A$ for entity A. In addition, a public key may be enerated that is associated with a unique credential received from a trusted entity $CA_i$ by deriving the public key from the unique credential and a public value associated with the trusted entity $CA_i$.

In another form, there is provided a method and associated apparatus for generating a unique credential at a trusted entity CA in a secure digital communication system. As disclosed, the trusted entity CA may receive a credential request from a first entity A which includes an implicit certificate associated with a private key at the first entity A. Alternatively, the trusted entity may otherwise obtain an implicit certificate (e.g., an ECQV certificate) associated with a private key of a first entity A, either from memory storage, from a first correspondent/entity A, or from another trusted entity. The trusted entity CA transforms the implicit certificate into a unique credential and associated private key contribution value from the trusted entity CA. In selected embodiments, the transformation process starts by extracting a first public value from the implicit certificate, and then computing a public reconstruction value (e.g., by mathematically combining the first public value with one or more public values associated with the trusted entity CA) and constructing an identity value distinguishing the first entity A so that the unique credential can be constructed as a new implicit certificate from the public reconstruction value and the identity value. The public reconstruction value may be computed by parsing the implicit certificate into a first public reconstruction value and a first identity value, combining these parsed values in accordance with a first mathematical function (e.g., secure hash function) to derive entity information, and then combining the entity information with the first public reconstruction value and one or more public key values of the trusted entity CA to derive the public reconstruction value. In addition, the private key contribution value may be computed by binding a hash of the unique credential with private values of the trusted entity CA. Finally, the trusted entity CA sends the unique credential and associated private key contribution value to the first entity A.

In yet another form, there is provided a cryptographic unit of a first correspondent or entity for generating a plurality of implicit certificates for a corresponding plurality of public keys from a single credential request in a data communication system. As disclosed, the cryptographic unit may be implemented with hardware and/or software executed by one or more processor elements, and is configured to send a single credential request to a plurality of certificate authorities comprising a first value associated with a public value for the first entity. In selected embodiments, the cryptographic unit sends the credential request as a single ECQV certificate associated with the public key value for the first entity, and in other embodiments, the cryptographic unit sends the credential request as a single elliptic curve public key value for the first entity using predetermined elliptic curve domain parameters for the secure digital communication system. The cryptographic unit at the first entity is also configured to receive from each of the plurality of certificate authorities a unique Elliptic Curve Qu-Vanstone (ECQV) certificate and associated private key contribution value that are uniquely generated from the single credential request, thereby obtaining a plurality of unique ECQV certificates from the corresponding plurality of certificate authorities. The cryptographic unit at the first entity may also be configured to compute a private key from one of the plurality of unique ECQV certificates by parsing a first unique ECQV certificate into a first public reconstruction value and a first identity value for the first entity. The parsed first public reconstruction value and first identity value may then be combined in accordance with a first hash function to derive entity information, and the entity information may then be combined with a private key value associated with the public value for the first entity and with the private key contribution value associated with the first unique ECQV certificate to derive a first private key.

In still yet another form, there is provided a cryptographic unit of a trusted entity for facilitating generation of a public key for a first entity A in a data communication system. As disclosed, the cryptographic unit may be implemented with hardware and/or software executed by one or more processor elements, and is configured to obtain an implicit certificate associated with a private key of the first entity A, to transform the implicit certificate into a unique ECQV certificate and associated private key contribution value, and to send the unique ECQV certificate and associated private key contribution value to the first entity A. In selected embodiments, the implicit certificate is transformed by extracting a first public value from the implicit certificate; computing a public reconstruction value by mathematically combining the first public value with one or more public values associated with the trusted entity; constructing an identity value distinguishing the first entity A; and constructing the ECQV certificate from the public reconstruction value and the identity value.

Although the described exemplary embodiments disclosed herein are described with reference to using a registered EC public key or ECQV certificate as a credential request to different certificate authorities to obtain a plurality of new credentials, the present invention is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. For example, other implicit certificate algorithms may be used, such as those disclosed in U.S. Pat. No. 6,792,530 which is incorporated by reference as if fully set forth herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for generating a plurality of unique credentials from a single credential request value in a secure digital communication system having a plurality of trusted entities and at least one subscriber device, the method comprising:
obtaining a secret value and associated public value for a subscriber device;
sending, by an input/output circuit of the subscriber device, a single credential request to the plurality of trusted entities, the single credential request comprising a first value associated with the public value; and
receiving, from each of the plurality of trusted entities, by the input/output circuit of the subscriber device, a unique credential and associated private key contribution value, thereby obtaining a plurality of unique credentials from the corresponding plurality of trusted entities.

2. The method of claim 1, wherein obtaining the secret value and associated public value comprises generating an ephemeral public-key pair associated with predetermined elliptic curve domain parameters for the secure digital communication system.

3. The method of claim 1, wherein sending the single credential request comprises sending the public value to the plurality of trusted entities.

4. The method of claim 1, wherein sending the single credential request comprises sending to the plurality of trusted entities a previously issued implicit certificate associated with the public key value.

5. The method of claim 1, wherein sending the single credential request comprises sending to the plurality of trusted entities an Elliptic Curve Qu-Vanstone (ECQV) certificate associated with the public key value using predetermined elliptic curve domain parameters for the secure digital communication system.

6. The method of claim 1, wherein receiving the unique credential and associated private key contribution value from each of the plurality of trusted entities comprises receiving, from each trusted entity, an implicit certificate and associated private key contribution value,
where the implicit certificate comprises (1) a public reconstruction value computed at the trusted entity by mathematically combining public values associated with the trusted entity and the subscriber device, and (2) an identity value for the subscriber device constructed at the trusted entity, and
where the associated private key contribution value is computed at the trusted entity by binding a hash of the implicit certificate with private values of the trusted entity.

7. The method of claim 1, further comprising storing the secret value in a secure memory that provides confidentiality and data integrity.

8. The method of claim 1, further comprising storing each unique credential and associated private key contribution value in a memory that requires data integrity.

9. The method of claim 1, further comprising generating a private key that is associated with a unique credential received from a trusted entity by deriving the private key from the unique credential, associated private key contribution value, and secret value for the subscriber device.

10. The method of claim 1, further comprising generating a public key that is associated with a unique credential received from a trusted entity by deriving the public key from the unique credential and a public value associated with the trusted entity.

11. A method for generating a unique credential at a trusted entity device in a secure digital communication system, the method comprising:
obtaining at the trusted entity device an implicit certificate associated with a private key of a first entity;
transforming, by a circuit of the trusted entity device, the implicit certificate into a unique credential and associated private key contribution value, wherein the transforming step includes
extracting a first public value from the implicit certificate;
computing a public reconstruction value by mathematically combining the first public value with one or more public values associated with the trusted entity device; and
sending the unique credential and associated private key contribution value to the first entity.

12. The method of claim 11, where obtaining the implicit certificate comprises obtaining an Elliptic Curve Qu-Vanstone (ECQV) certificate associated with the private key at the first entity using predetermined elliptic curve domain parameters for the secure digital communication system.

13. The method of claim 11, where transforming the implicit certificate further comprises:
constructing an identity value distinguishing the first entity; and
constructing the unique credential as a new implicit certificate from the public reconstruction value and the identity value.

14. The method of claim 13, where extracting the first public value comprises parsing the implicit certificate in the credential request into a first public reconstruction value and a first identity value for the first entity.

15. The method of claim 14, where computing the public reconstruction value comprises:
combining the first public reconstruction value and first identity value for the first entity in accordance with a first mathematical function to derive entity information; and
combining the entity information with the first public reconstruction value and one or more public key values of the trusted entity device to derive the public reconstruction value.

16. The method of claim 15, where the first mathematical function comprises a secure hash function.

17. The method of claim 11, where transforming the implicit certificate comprises computing the private key contribution value by binding a hash of the unique credential with private values of the trusted entity device.

18. The method of claim 11, further comprising receiving a credential request at the trusted entity device from the first entity comprising an implicit certificate associated with a private key at the first entity.

19. A subscriber device for generating a plurality of implicit certificates for a corresponding plurality of public keys from a single credential request in a data communication system, said subscriber device comprising:
   an input/output circuit configured to send a single credential request to a plurality of certificate authorities comprising a first value associated with a public value for the subscriber device, and receive from each of the plurality of certificate authorities a unique Elliptic Curve Qu-Vanstone (ECQV) certificate and associated private key contribution value that are uniquely generated from the single credential request, thereby obtaining a plurality of unique ECQV certificates from the corresponding plurality of certificate authorities.

20. The subscriber device of claim 19, wherein the input/output circuit is configured to send the single credential request by sending to the plurality of certificate authorities a single ECQV certificate associated with the public key value for the subscriber device using predetermined elliptic curve domain parameters for the secure digital communication system.

21. The subscriber device of claim 19, wherein the subscriber device is configured to send the single credential request by sending to the plurality of certificate authorities a single elliptic curve public key value for the subscriber device using predetermined elliptic curve domain parameters for the secure digital communication system.

22. The subscriber device of claim 19, further comprising a processor circuit configured to compute a private key from one of the plurality of unique ECQV certificates by:
   parsing a first unique ECQV certificate into a first public reconstruction value and a first identity value for the first entity;
   combining the first public reconstruction value and first identity value for the first entity in accordance with a first hash function to derive entity information; and
   combining the entity information with a private key value associated with the public value for the subscriber device and with the private key contribution value associated with the first unique ECQV certificate to derive a first private key.

23. A trusted entity device for facilitating generation of a public key for a subscriber device in a data communication system, said trusted entity device comprising:
   a processing circuit configured to obtain an implicit certificate associated with a private key of the subscriber device, and transform the implicit certificate into a unique Elliptic Curve Qu-Vanstone (ECQV) certificate and associated private key contribution value; and
   an input/output circuit configured to send the unique ECQV certificate and associated private key contribution value to the subscriber device,
   wherein the processing circuit is further configured to transform the implicit certificate by
   extracting a first public value from the implicit certificate;
   computing a public reconstruction value by mathematically combining the first public value with one or more public values associated with the trusted entity device.

24. The trusted entity device of claim 23, wherein the processing circuit is further configured to transform the implicit certificate by:
   constructing an identity value distinguishing the subscriber device; and
   constructing the ECQV certificate from the public reconstruction value and the identity value.

* * * * *